May 28, 1963

G. E. DICKINSON 3,091,194

METHOD OF MAKING A FROZEN CONFECTION

Filed Nov. 28, 1960

GERALD E. DICKINSON
*INVENTOR.*

BY 3,091,194
METHOD OF MAKING A FROZEN CONFECTION
Gerald E. Dickinson, Coeur d'Alene, Idaho, assignor of one-half to Coeur d'Alene Creamery, Inc., Coeur d'Alene, Idaho, a corporation of Idaho
Filed Nov. 28, 1960, Ser. No. 72,024
6 Claims. (Cl. 107—54)

The present invention relates to frozen confections and has particular relation to a new and improved method of providing various combinations of aesthetic qualities in a frozen confection in a most efficient, economical and sanitary manner. The aesthetic qualities for example, comprising: flavors, colors and/or odors which are commonly incorporated in frozen confections made of an edible substance such as flavored syrup, water-ice, sherbet, ice-cream, frozen custard and the like.

Heretofore, confectionery products made in the form of individual servings, have consisted of various combinations of color, flavors and/or substances. But, the disadvantages encountered in their manufacture have prevented their production on a commercial scale approaching that of the single color, flavor and/or substance confectionery having a coating or not.

Confectionery products of combined color, flavor and/or substance have been made by hand molding in the past. More recently, improved molding operations have been devised which materially reduced the number of steps required to produce confectionery of this character, wherein each individual serving may consist of various combinations of color and flavors.

It is therefore an object of the present invention to provide a new and improved method of manufacturing confectionery products having plural colors, flavors or other aesthetic qualities in a most efficient, economical and sanitary manner with a minimum number of operating steps and with a minimum expenditure of time.

A further object of the present invention lies in the provision of a method of making a frozen confection having various combinations of colors, odors and/or flavors which method obviates the necessity of sequentially adding portions of various premixed edible substances to corporately form a body having various combinations of flavors, odors and/or colors.

Another object of the present invention is to provide a method of making a frozen confection of plural colors, odors and/or flavors by altering any of these aesthetic qualities in an unfrozen portion of the body of edible substance of which a portion has been previously frozen.

Yet another object of the present invention lies in the provision of a method of making a frozen confection having various combinations of flavors, odors and/or colors in which a predetermined portion of a body of edible substance is solidly frozen and thence the unfrozen portion is altered in aesthetic quality by immersing therein a handle member portion carrying a substance capable of changing the aesthetic quality of the unfrozen portion and thereby diffusing the said substance in said unfrozen portion subsequent to which the last named portion is solidly frozen, thereby attaching the handle by congelation.

Other and further objects and advantages of the invention will be found in the detailed description of the method employed and the apparatus used which result in simplicity, economy and efficiency and which will be further apparent from the appended drawings wherein a preferred form of embodiment of the invention is shown, and in which.

Throughout the specification and claims of this disclosure I employ the term "aesthetic quality" or variations thereof to mean colors, odors and/or flavors.

Figure 1:
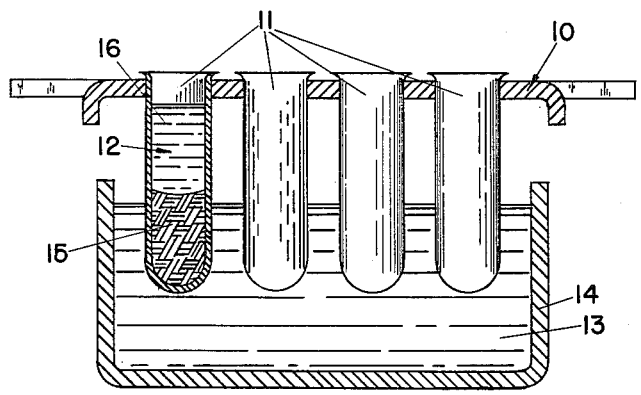
FIGURE 1 is a longitudinal sectional view of plural molds suspended partially in a refrigerating medium and showing one mold filled completely with the substance to be frozen.
Figure 2:
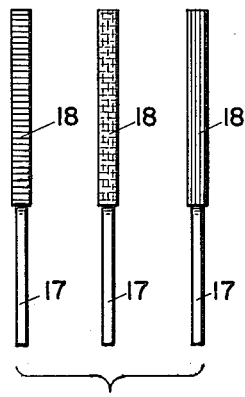
FIGURE 2 is an elevational view of plural handle members, each of which has a portion carrying a soluble substance or substances in concentrated form, capable of changing the aesthetic quality and being lined to indicate color.
Figure 3:
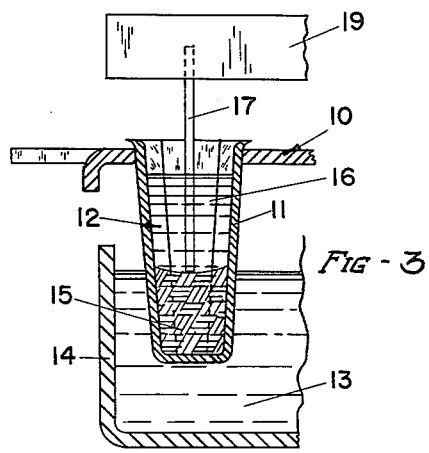
FIGURE 3 is a longitudinal sectional view of one mold having a handle member portion immersed in the unfrozen portion of the edible substance.
Figure 4:
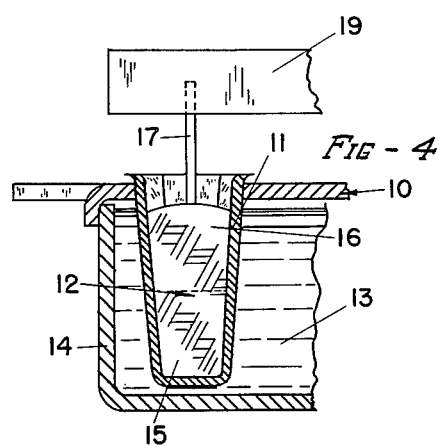
FIGURE 4 is a longitudinal sectional view showing the whole of said frozen confection subjected to refrigeration.
Figure 5:
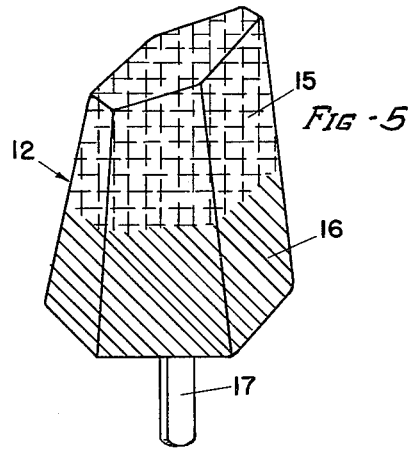
FIGURE 5 is a perspective view of a frozen confection depicting one combination of aesthetic qualities by color variations.

Referring now to the drawing there is shown in FIGURE 1 a frame 10 which is adapted to support plural molds 11 which may be of any desired size and shape commensurate with forming a frozen confection and admitting of its removal therefrom.

Preferably, the molds are of a shape to receive congealable substance which is fluid at normal temperatures to form a body 12 of edible substance.

In the exercise of the present invention, one, by any means available, fills each and every mold 11 with said congealable substance while in the fluid state in quantity sufficient for the finished confection. Each and every mold 11 is then lowered to a degree less than entirely into the brine 13 contained in the brine tank 14, which brine is maintained at a temperature substantially below that temperature required to congeal or solidly freeze the body of edible substance 12, whereupon the portion 15 of the body of edible substance 12 becomes solidly frozen, while the other portion 16 at this time remains unfrozen. The unfrozen portion 16 has its aesthetic quality or qualities changed by introducing therein a coloring matter, flavor and/or odor producing concentrate which is soluble in the unfrozen portion of the edible substance. Thus it will be seen that the portion 16 may take on a selective color, flavor and/or odor which is different from that color, flavor and/or odor of the frozen portion 15.

The vehicle by means of which the concentrated substance or matter 18 having the ability to change the aesthetic qualities, though not necessarily limited thereto, preferably is a handle member 17 which has a portion upon which the concentrated substance 18 capable of changing the aesthetic quality of the edible substance is deposited. This portion may be provided with the said substance 18 by dipping, painting or any one of a number of common methods for applying a similar substance thereto.

The handle members 17 are conventionally supported by a rack structure 19 which is provided with conventional means (not shown) for receiving and releasably locking the handle members 17 therein. In some instances, where the edible substance is of a viscosity which so requires, the handle members 17 will be agitated in the unfrozen body portion 16 to diffuse the aesthetic substance 18 therein.

After changing the aesthetic quality as described, the frame 10 is lowered so that the entire body of edible substance 12 is subjected to refrigeration until the whole of said confection is in a solid frozen state and thereby attached to the handle by congelation.

Obviously, if it is desired that the frozen confection shall not have a handle, the handle 17 or similar substitute, for admitting the substance 18, may be removed prior to lowering the frame 10 to subject the unfrozen portion of the edible body 12 to refrigeration. I have thus provided for producing the resultant confection having various colors, flavors and/or odors with or without a handle 17.

Obviously, if it is desired to provide the frozen confection with more than two colors, the steps of changing the unfrozen portion of the edible substance 12 and subjecting a selected portion of that changed portion to refrigeration until solidly frozen may be multiplied sequentially until the whole of the confection is in a solid frozen state. For example, the body of edible substance 12 may be initially clear in color and a portion thereof, say, one-third, unfrozen in the initial step. Coloring matter may be added to change the unfrozen portion to a light yellow, the mold may be lowered until two thirds of the body of edible substance is subjected to refrigeration and solidly frozen and then for example, a blue color may be added in quantity to change the balance of the unfrozen portion to green whereupon the mold may be lowered to subject the whole of the body of edible substance to refrigeration until it is solidly frozen. The handle 17 may or may not be attached by congelation in the last segment of the frozen confection according to manual selection.

While the immediately foregoing illustration refers to color, it is not my intention to limit this invention to color alone, but I desire to secure the invention broadly as it relates to all of the aesthetic qualities, i.e., color, flavor and/or odor, as set forth in the appended claims.

It will be apparent to those skilled in the art that the invention is not limited to the present description but that various other modifications may be made therein without departing from the spirit thereof or from the scope of the appended claims.

Having thus described my invention, I desire to secure by Letters Patent of the United States of America the following:

1. The method of making a two-color frozen confection which comprises: filling a mold with a congealable substance, fluid at normal temperatures, in quantity sufficient for the finished confection; subjecting only a predetermined portion of said substance in the mold to refrigeration at least until said portion is solidly frozen; coloring the unfrozen portion of said substance; and subjecting the last named portion of said substance to refrigeration until the whole of said confection is in a solidly frozen state.

2. The method of making a frozen confection which comprises: filling a mold with a congealable substance, fluid at normal temperatures, in quantity sufficient for the finished confection; subjecting only a selected portion of said substance in the mold to refrigeration at least until said portion is solidly frozen; changing the aesthetic quality of the unfrozen portion of said substance; subjecting a selected quantity less than all of the last-named portion of said substance to refrigeration until the aforesaid selected quantity is also solidly frozen; and additionally, performig the two last-named steps sequentially until the whole of said confection is in a solidly frozen state.

3. The method of making a frozen confection which comprises: filling a mold with a congealable initially fluid substance in quantity sufficient for the finished confection; subjecting only a selected portion of said substance in the mold to refrigeration at least until said portion is solidly frozen; changing the aesthetic quality of the unfrozen portion of said substance; and subjecting the last-named portion of said substance to refrigeration until the whole of said confection is in a solidly frozen state.

4. The method of making a frozen confection of the character described which comprises: subjecting only a selected portion of a body of edible substance, which is fluid at normal temperatures, to refrigeration at least until said portion is solidly frozen; immersing a handle member portion carrying a fluid soluble coloring matter in the unfrozen portion of said substance, and thereby coloring said unfrozen portion; and subjecting the last-named portion of said substance to refrigeration until the whole of said confection is in a solidly frozen state and thereby attached to the handle by congelation.

5. The method of coloring a frozen confection which comprises: immersing a handle member portion which carries a fluid soluble coloring matter in a body of edible susbtance which is fluid at normal temperatures; effecting dispersal of the coloring matter by agitation; and subjecting the body to refrigeration until the whole is in a solidly frozen state about the handle.

6. The method of making a frozen confection of the character described which comprises: subjecting only a selected portion of a body of edible substance, which is fluid at normal temperatures, to refrigeration at least until said portion is solidly frozen; immersing a handle member portion carrying a substance capable of changing an aesthetic quality of said edible substance into the unfrozen portion of said substance and thereby changing said aesthetic quality of the unfrozen portion; and subjecting the last named portion of said substance to refrigeration until the whole of said confection is in a solidly frozen state and thereby attached to the handle by congelation.

References Cited in the file of this patent

UNITED STATES PATENTS

| | | |
|---|---|---|
| 1,952,101 | Snodgrass | Mar. 27, 1934 |
| 2,179,225 | Thomas | Nov. 7, 1939 |